(12) United States Patent
Throm et al.

(10) Patent No.: US 10,139,254 B2
(45) Date of Patent: Nov. 27, 2018

(54) METHOD FOR MANUFACTURING A MEASUREMENT SENSOR FOR A MOTOR VEHICLE

(71) Applicants:Continental Automotive France, Toulouse (FR); Continental Automotive GmbH, Hannover (DE)

(72) Inventors: Martin Throm, Toulouse (FR); Hervè Contet, Lamasquère (FR); Denis Itard, Cugnaux (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/749,326

(22) PCT Filed: Aug. 1, 2016

(86) PCT No.: PCT/EP2016/001327
§ 371 (c)(1),
(2) Date: Jan. 31, 2018

(87) PCT Pub. No.: WO2017/028945
PCT Pub. Date: Feb. 23, 2017

(65) Prior Publication Data
US 2018/0224305 A1    Aug. 9, 2018

(30) Foreign Application Priority Data
Aug. 18, 2015   (FR) ...................................... 15 57786

(51) Int. Cl.
*G01D 11/24*    (2006.01)
*B29C 45/00*    (2006.01)
*B29C 45/14*    (2006.01)

(52) U.S. Cl.
CPC ........ *G01D 11/245* (2013.01); *B29C 45/0053* (2013.01); *B29C 45/14639* (2013.01)

(58) Field of Classification Search
CPC .............. G01D 11/245; B29C 45/0053; B29C 45/14639; B29C 33/00; G01L 19/141; G01P 1/02
See application file for complete search history.

(56) References Cited

U.S. PATENT DOCUMENTS

| | | | | |
|---|---|---|---|---|
| 5,414,355 A | * | 5/1995 | Davidson ............... | G01B 7/001 123/617 |
| 5,714,409 A | * | 2/1998 | Parsons ............... | G01L 19/0084 430/51 |

(Continued)

FOREIGN PATENT DOCUMENTS

| | | | | |
|---|---|---|---|---|
| DE | 102009029769 A1 | 12/2010 | | |
| FR | 2872964 A1 | * | 1/2006 | ............. H01R 43/00 |
| FR | 2965348 A1 | 3/2012 | | |

OTHER PUBLICATIONS

English translation of the Written Opinion for International Application No. PCT/EP2016/001327, dated Oct. 28, 2016, 5 pages.

(Continued)

*Primary Examiner* — Patrick Assouad
*Assistant Examiner* — Sean Curtis
(74) *Attorney, Agent, or Firm* — RatnerPrestia

(57) ABSTRACT

A method for manufacturing a measurement sensor for a motor vehicle is disclosed. The vehicle has a body and an electronic measurement module mounted in the body. The method includes molding the body of the sensor so as to define, in one and the same material, a base for fastening the sensor, an element for receiving the electronic measurement module, and a seal. The element delineates a space for receiving the electronic measurement module and includes a first cylindrical portion with a circular cross section and a (Continued)

second cylindrical portion with a circular cross section. The diameter of the second cylindrical portion is smaller than the diameter of the first cylindrical portion. The method further includes mounting the electronic measurement module in the reception space, and overmolding the element for receiving the electronic measurement module.

11 Claims, 3 Drawing Sheets

(56) References Cited

U.S. PATENT DOCUMENTS

| | | | | |
|---|---|---|---|---|
| 6,534,994 B1* | 3/2003 | Doderer | | G01P 1/02 |
| | | | | 324/500 |
| 7,398,704 B2* | 7/2008 | Loscher | | G01P 1/026 |
| | | | | 73/866.5 |
| 7,836,764 B2* | 11/2010 | Theuss | | G01D 11/245 |
| | | | | 73/431 |
| 8,339,124 B2* | 12/2012 | Schneider | | G01D 5/20 |
| | | | | 324/207.2 |
| 9,244,089 B2* | 1/2016 | Tsuge | | G01P 3/487 |
| 9,371,786 B2* | 6/2016 | Casoni | | F02D 41/062 |
| 9,446,745 B2* | 9/2016 | Elliott | | B60T 8/368 |
| 9,649,796 B2* | 5/2017 | Panis | | B29C 45/1671 |
| 9,801,289 B2* | 10/2017 | Biegner | | H05K 5/0004 |
| 2002/0196014 A1* | 12/2002 | Iwase | | G01D 11/245 |
| | | | | 324/207.2 |
| 2005/0156780 A1* | 7/2005 | Bonthron | | G01S 3/48 |
| | | | | 342/107 |
| 2005/0225481 A1* | 10/2005 | Bonthron | | G01S 7/032 |
| | | | | 342/175 |
| 2007/0001664 A1* | 1/2007 | Steinbrink | | G01D 11/245 |
| | | | | 324/174 |
| 2007/0163337 A1* | 7/2007 | Loscher | | G01P 1/00 |
| | | | | 73/115.02 |
| 2008/0236278 A1* | 10/2008 | Theuss | | G01D 11/245 |
| | | | | 73/431 |
| 2009/0206846 A1* | 8/2009 | Sanchez | | G01D 5/2405 |
| | | | | 324/662 |
| 2010/0109654 A1* | 5/2010 | Schneider | | G01D 5/20 |
| | | | | 324/207.2 |
| 2011/0072894 A1* | 3/2011 | Saito | | F02D 41/187 |
| | | | | 73/114.34 |
| 2011/0138924 A1* | 6/2011 | Colombo | | G01L 19/0092 |
| | | | | 73/756 |
| 2011/0174080 A1* | 7/2011 | Zorzetto | | G01L 9/0051 |
| | | | | 73/756 |
| 2011/0179889 A1* | 7/2011 | De Volder | | B29C 33/126 |
| | | | | 73/866.5 |
| 2013/0054121 A1* | 2/2013 | Casoni | | F02D 41/062 |
| | | | | 701/104 |
| 2013/0133412 A1* | 5/2013 | Wallner | | H05K 3/284 |
| | | | | 73/115.02 |
| 2013/0255391 A1* | 10/2013 | Schlitzkus | | G01L 19/148 |
| | | | | 73/753 |
| 2014/0096609 A1* | 4/2014 | Tsai | | G10K 11/004 |
| | | | | 73/584 |
| 2014/0238370 A1* | 8/2014 | Pursifull | | F02D 41/005 |
| | | | | 123/690 |
| 2015/0070003 A1* | 3/2015 | Elliott | | B60T 8/368 |
| | | | | 324/207.15 |
| 2015/0147912 A1* | 5/2015 | Lutz | | H01R 13/5045 |
| | | | | 439/577 |
| 2015/0282335 A1* | 10/2015 | Biegner | | H05K 5/0004 |
| | | | | 361/752 |
| 2016/0061642 A1* | 3/2016 | Arai | | B29C 66/53462 |
| | | | | 73/273 |
| 2016/0104978 A1* | 4/2016 | Chaumeny | | H01R 13/6683 |
| | | | | 439/620.22 |
| 2016/0109279 A1* | 4/2016 | O'Neill | | G01F 23/38 |
| | | | | 73/313 |
| 2016/0297122 A1* | 10/2016 | Fischer | | B29C 45/1671 |
| 2016/0329037 A1* | 11/2016 | Wehling | | G10K 9/22 |
| 2017/0343442 A1* | 11/2017 | Lee | | F01P 7/16 |
| 2018/0142655 A1* | 5/2018 | Thomas | | F02M 51/005 |

OTHER PUBLICATIONS

International Search Report and Written Opinion for International Application No. PCT/EP2016/001327, dated Oct. 28, 2016, 9 pages.

\* cited by examiner

METHOD FOR MANUFACTURING A MEASUREMENT SENSOR FOR A MOTOR VEHICLE

CROSS REFERENCE TO RELATED APPLICATIONS

This application is the U.S. National Phase Application of PCT International Application No. PCT/EP2016/001327, filed Aug. 1, 2016, which claims priority to French Patent Application No. 1557786, filed Aug. 18, 2015, the contents of such applications being incorporated by reference herein.

FIELD OF THE INVENTION

The invention pertains to the field of the overmolding of measurement sensors for motor vehicles, and relates more particularly to a method for overmolding a measurement sensor for a motor vehicle, to such a measurement sensor and to a motor vehicle comprising such a sensor.

BACKGROUND OF THE INVENTION

In a motor vehicle, it is known to use sensors for measuring a parameter such as, for example, the rotational speed or the position of a drive shaft.

Such a sensor includes, in a known manner, a body made from a thermoplastic material overmolded around an electronic measurement module. This body makes it possible both to mount the sensor in a motor vehicle and to protect the electronic module from the gases and the projections generated by the motor vehicle.

To produce this overmolding, it is known to mount the electronic measurement module on a positioning carrier in a mold, and then to position the carrier in said mold and to overmold the body around the carrier and the electronic measurement module by injecting thermoplastic material.

Such overmolding is specific to each type of sensor with regard both to the volume of thermoplastic material that is injected and to the shape of the mold. It is thus necessary, for each type of sensor, to create a suitable mold and to carry out injection volume checking tests, which may prove complex, time-consuming and expensive, and therefore exhibits significant drawbacks.

When overmolding, it is also known to form sealing fins that take the form of ribs extending around sensing zones through which projections or gases generated by the motor vehicle could penetrate.

These sensing zones may for example correspond to the interfaces between the electronic measurement module or the positioning carrier and the body of the sensor.

The fins are thus often placed between zones where the differences in injected volumes of thermoplastic material may be very large. In this case, after the injection of thermoplastic material and when the latter cools, the thermoplastic material situated in the high-volume zones shrinks to a greater extent and draws the thermoplastic material situated in the low-volume zones, thereby possibly generating microcracks in the fins and a lack of sealtightness of the sensor, and therefore exhibits a major drawback.

One known solution for at least partly solving this problem consists in using a tool or a machine to maintain a pressure on the thermoplastic material in the low-volume zones when the thermoplastic material cools in order to avoid an excessively significant shrinkage toward the high-volume zones.

However, such a method is complex, time-consuming and expensive, thereby again exhibiting significant drawbacks.

SUMMARY OF THE INVENTION

An aim of the invention is to at least partly solve these drawbacks by proposing a simple, quick, reliable and effective solution for overmolding an electronic module of a measurement sensor for a motor vehicle.

To this end, an aspect of the invention relates, first of all, to a method for manufacturing a measurement sensor for a motor vehicle, said sensor comprising a body and an electronic measurement module mounted in said body, said method comprising:

a step of molding the body of the sensor so as to define, in one and the same material, a base for fastening the sensor in a motor vehicle, an element for receiving the electronic measurement module, delineating a space for receiving the electronic measurement module and comprising a first cylindrical portion with a circular cross section and a second cylindrical portion with a circular cross section, the diameter of the second cylindrical portion being smaller than the diameter of the first cylindrical portion, and sealing means made from material of said second portion, a step of mounting the electronic measurement module in the reception space, and a step of overmolding the element for receiving the electronic measurement module.

The terms "a first cylindrical portion with a circular cross section and a second cylindrical portion with a circular cross section" are understood to mean that the first cylindrical portion and the second cylindrical portion have a cylindrical wall with a circular cross section, the latter possibly being able to have apertures or orifices, for example for the passage of the electronic measurement module or of connection pins.

The method according to an aspect of the invention makes it possible to define volumes for the injection of thermoplastic material that are substantially equal at the first cylindrical portion and at the second cylindrical portion, which make it possible to avoid a shrinkage of material upon cooling after overmolding, and thus to limit or even prevent the occurrence of cracks or of shearing on the sealing means.

The reception element furthermore defines a generic zone that makes it possible to mold different types of sensors, for example for various clients, thereby simplifying the production of said sensors; the protective overmolding step may be identical from one sensor to another, thereby making it quick to produce the sensors while at the same time reducing the costs, since one and the same overmolding tool may be used for various sensors.

According to one aspect of the invention, the molding step makes it possible to define sealing means comprising at least one circular fin made from material of the second cylindrical portion, such a fin being easy to define.

The molding step preferably makes it possible to define sealing means comprising two circular fins with an identical diameter and that are arranged in parallel, two fins making it possible to ensure good sealtightness of the sensor.

More preferably, the molding step makes it possible to define the reception element such that the difference between the diameter of the second cylindrical portion and the diameter of the first cylindrical portion is less than 1 mm.

The molding step advantageously makes it possible to define the reception element such that it is linked to the base at a linking wall with a circular cross section the diameter of which is greater than the diameter of the first cylindrical portion, and such that the difference between the diameter of the linking wall and the diameter of the first cylindrical portion is less than 2 mm. This makes it possible to optimize the amount of thermoplastic material that is necessary for the diameter of the linking wall to be substantially the same as that of the protective overmolding.

According to one aspect of the invention, the molding step makes it possible to define the reception element such that the difference between the diameter of the linking wall and the diameter of the first cylindrical portion is less than 1 mm. This makes it possible to optimize the amount of thermoplastic material used to make the diameter of the linking wall substantially the same as that of the protective overmolding to an even greater extent, and thus to obtain overmolding thicknesses that are relatively homogeneous, in particular between the first cylindrical portion and the second cylindrical portion, while at the same time keeping a reduced bulk, thereby making it possible, in a beneficial manner, to avoid cracks in the material.

An aspect of the invention also relates to a measurement sensor for a motor vehicle, said sensor comprising a body, an electronic measurement module and a protective overmolding, said body comprising a base for fastening the sensor in a motor vehicle, an element for receiving the electronic measurement module, made from material of the base, comprising a first cylindrical portion with a circular cross section delineating a space in which the electronic measurement module is mounted and a second cylindrical portion, the diameter of the second cylindrical portion being smaller than the diameter of the first cylindrical portion, the protective overmolding enveloping the element for receiving the electronic measurement module, and sealing means made from material of said second cylindrical portion.

The sensor according to an aspect of the invention has volumes of thermoplastic overmolding material that are substantially equal at the first cylindrical portion and at the second cylindrical portion, which make it possible to have solid sealing means, thus ensuring good sealtightness of the sensor.

According to one aspect of the invention, the sealing means comprise at least one circular fin made from material of the second cylindrical portion, such a fin being easy to manufacture.

The sealing means preferably comprise two circular fins with an identical diameter and that are arranged in parallel so as to ensure good sealtightness of the sensor.

More preferably, the difference between the diameter of the second cylindrical portion and the diameter of the first cylindrical portion is less than 1 mm.

The reception element is advantageously linked to the base at a linking wall with a circular cross section the diameter of which is greater than the diameter of the first cylindrical portion, the difference between the diameter of the linking wall and the diameter of the first cylindrical portion being less than 2 mm. This makes it possible to limit the amount of thermoplastic material that is necessary for the diameter of the linking wall to be substantially the same as that of the protective overmolding.

The difference between the diameter of the linking wall and the diameter of the first cylindrical portion is preferably less than 1 mm. This makes it possible to limit the amount of thermoplastic material that is necessary for the diameter of the linking wall to be substantially the same as that of the protective overmolding.

According to one aspect of the invention, the diameter of the linking wall is greater than the diameter of the first cylindrical portion, such that the linking wall forms a stop surface for the protective overmolding, and thus to obtain overmolding thicknesses that are relatively homogeneous, in particular between the first cylindrical portion and the second cylindrical portion, while at the same time keeping a reduced bulk, thereby making it possible, in a beneficial manner, to avoid cracks in the material.

According to another aspect of the invention, the protective overmolding being cylindrical with a circular cross section, the diameter of the linking wall is equal to the external diameter of the protective overmolding in order to make the sensor easy to use.

An aspect of the invention relates, lastly, to a vehicle comprising a measurement sensor such as presented previously.

BRIEF DESCRIPTION OF THE DRAWINGS

Other features and advantages of aspects of the invention will emerge during the following description given with reference to the appended figures, which are given by way of nonlimiting example and in which identical references are given to similar objects.

DETAILED DESCRIPTION OF THE PREFERRED EMBODIMENTS

Figure 1:
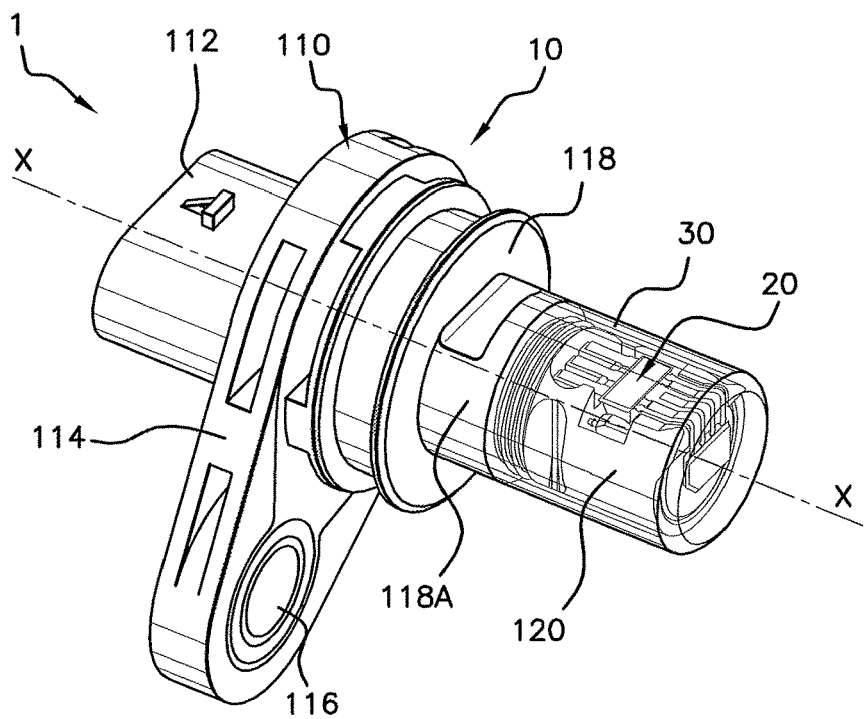
FIG. 1 illustrates, in perspective, a form of implementation of the sensor according to the invention, the protective overmolding of the reception element.

The measurement sensor according to the invention is intended to be mounted in a motor vehicle. Such a sensor may, for example, be a sensor for measuring the speed of the vehicle, a sensor for measuring the rotation of a drive shaft of the vehicle, a pressure measurement sensor, or any other measurement sensor for a motor vehicle. With reference to FIG. 1, the measurement sensor 1 according to an aspect of the invention comprises a body 10, an electronic measurement module 20 mounted in said body 10 and a protective overmolding 30 that is illustrated transparently for the sake of clarity.

Figure 2:
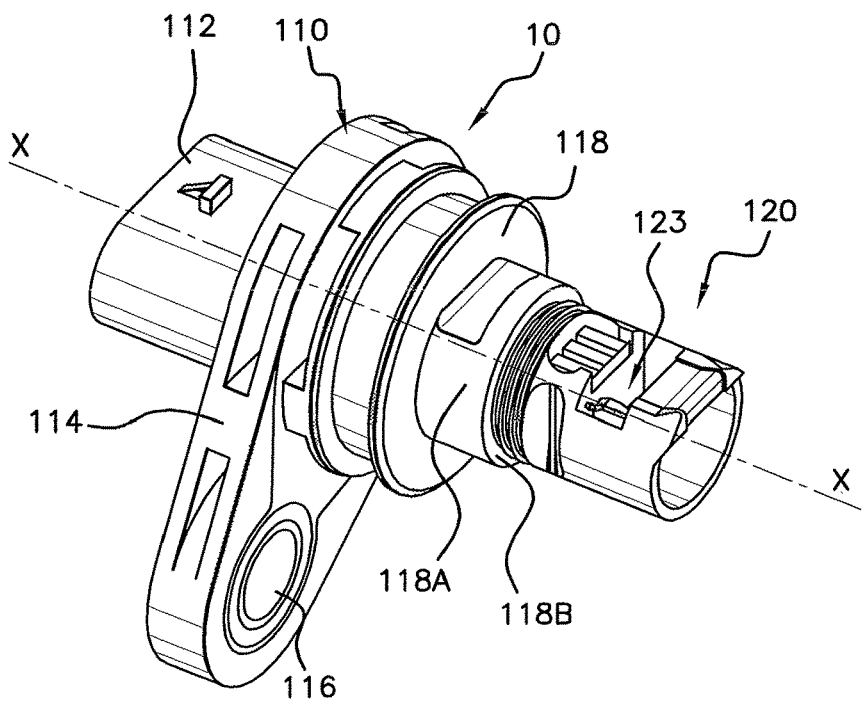
FIG. 2 illustrates, in perspective, the body of the sensor of FIG. 1 before the mounting of an electronic measurement module in the reception element.

With reference to FIG. 2, the body 10 comprises a base 110 for fastening the sensor 1 in a motor vehicle, an element 120 for receiving the electronic measurement module 20, and sealing means.

The base 110 comprises, first of all, a connecting portion 112, in this example taking the form of a barrel with an oval cross section and made from material of the base 110 and extending along a longitudinal axis XX.

This connecting portion 112 is designed to enable the sensor 1 to be connected to an electrical connector of the vehicle (not shown) such that the electronic measurement module 20 communicates with the electrical communication network of the vehicle (not shown), in particular to send to it signals representative of the measurements that said electronic measurement module 20 carries out during operation of the sensor 1.

The base 110 then comprises a plate 114 made from material of said base 110 and extending perpendicularly to the longitudinal axis XX. This plate 114 delineates an orifice in which is mounted a fastening ring 116, enabling the sensor 1 to be mounted on an element of a motor vehicle, for example facing a drive shaft.

The base 110 lastly comprises a linking part 118 comprising a cylindrical portion 118A, with a circular cross section, for linking to the reception element 120.

To this end, the cylindrical linking portion 118A comprises a linking wall 118B with a circular cross section, at which wall the reception element 120 is linked to the cylindrical linking portion 118A.

Figure 3:
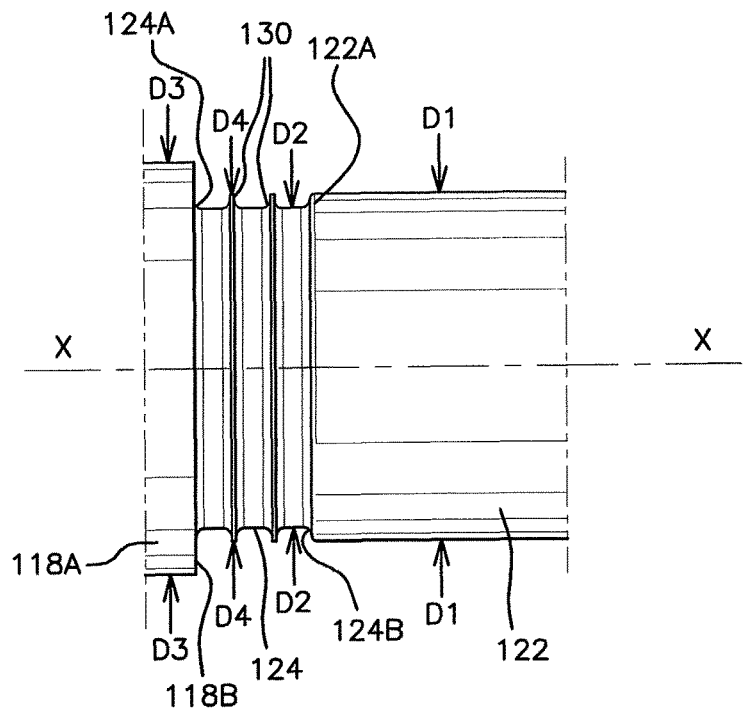
FIG. 3 is a partial view of the side of the reception element and of the linking wall of the sensor of FIG. 1.

The reception element 120 is made from material of the linking part 118 and comprises, with reference to FIG. 3, a first cylindrical portion 122 defining an external diameter D1 and a second cylindrical portion 124 with a circular cross section defining an external diameter D2, smaller than the diameter D1, of the first cylindrical portion 122. It will be noted that the external diameter D3 of the linking portion 118A is greater than the diameter D1 of the first cylindrical portion 122 and than the diameter D2 of the second cylindrical portion 124.

As illustrated in FIGS. 1 to 4, the first cylindrical portion 122 and the second cylindrical portion 124 extend along one and the same longitudinal axis, which is also the longitudinal axis XX.

The first cylindrical portion 122 has a linking end 122A and a free end 122B. The second cylindrical portion 124 has a first end 124A and a second end 124B.

The reception element 120 is linked to the linking wall 118B of the base 110 at the first end 124A of the second cylindrical portion 124.

The first cylindrical portion 122 is linked, by its linking end 122A, to the second end 124B of the second cylindrical portion 124.

The first cylindrical portion 122 delineates a space 123 in which the electronic measurement module 20 is mounted.

Figure 4:
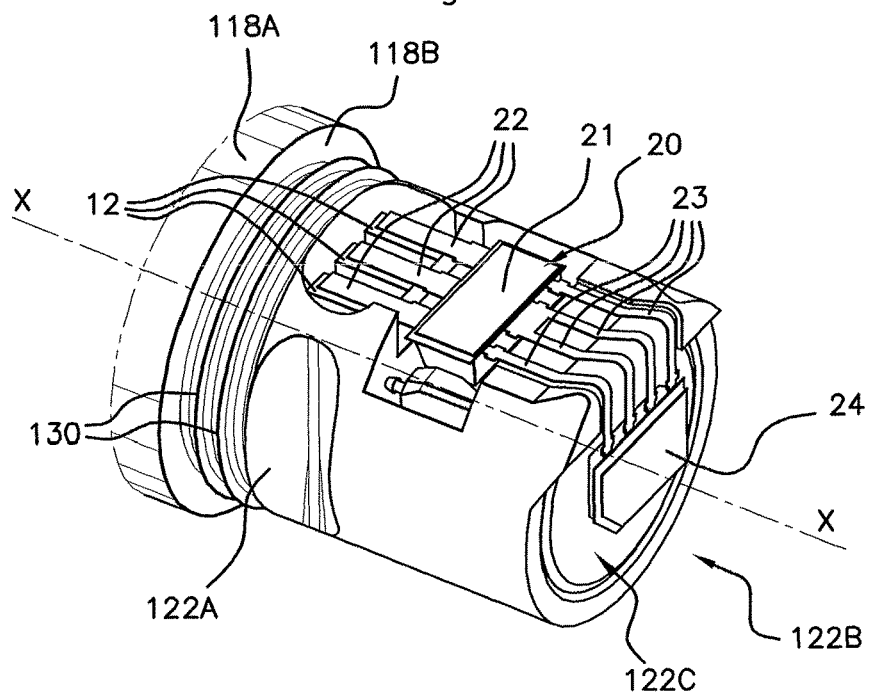
FIG. 4 is a partial perspective view of the reception element of the sensor of FIG. 1, in which is mounted an electronic measurement module, before overmolding of the reception element.

As illustrated in FIG. 4, the electronic measurement module 20 takes the form, in this example that is given for illustrative purposes, of an integrated circuit 21 for measurement management, from which circuit there extend a first plurality of pins 22 that are intended to be electrically connected to the vehicle and a second plurality of pins 23 that are electrically connected to a sensing element 24 mounted on the face 122C of the free end 122B of the first cylindrical portion 122.

The sensing element 24, in a known manner, makes it possible to convert physical quantities of a parameter, such as for example a position, a speed, a pressure, etc., into electrical signals that are then sent, by the integrated circuit 21 for measurement management, to a computer of the motor vehicle.

In this example, there are three connection pins 22 that ensure, in a known manner, the transmission of electrical power supply signals, the transmission of the measurement signals sent by the integrated circuit 21 and the ground function, respectively.

The sealing means make it possible to prevent liquids from flowing between the body 10 of the sensor 1 and the protective overmolding 30 to the electronic measurement module 20.

These sealing means are made from material of the second cylindrical portion 124. In this example, the sealing means advantageously take the form of two circular fins 130 with an external diameter D4, extending radially with respect to the longitudinal axis XX from the periphery of the second cylindrical portion 124, over a small radial distance, preferably less than 1 mm, for example of the order of 0.7 mm.

Thus, and according to an aspect of the invention, the difference between the diameter D4 of the circular fins 130 and the diameter D3 of the linking portion 118A is small enough that the difference between the volume of material to be injected to form the protective overmolding 30 around the first cylindrical portion 122 and the volume of material to be injected to form the protective overmolding 30 around the second cylindrical portion 124 is substantially equal to zero, thus making it possible to prevent the injected material from moving to an overly significant extent when cooling (a phenomenon called "material shrinkage", in a known manner) and from damaging the circular fins 130.

In one preferred form of implementation, the difference between the diameter D4 of the circular fins 130 and the diameter D3 of the linking portion 118A is less than 2 mm, for example of the order of 1.6 mm.

Figure 5:
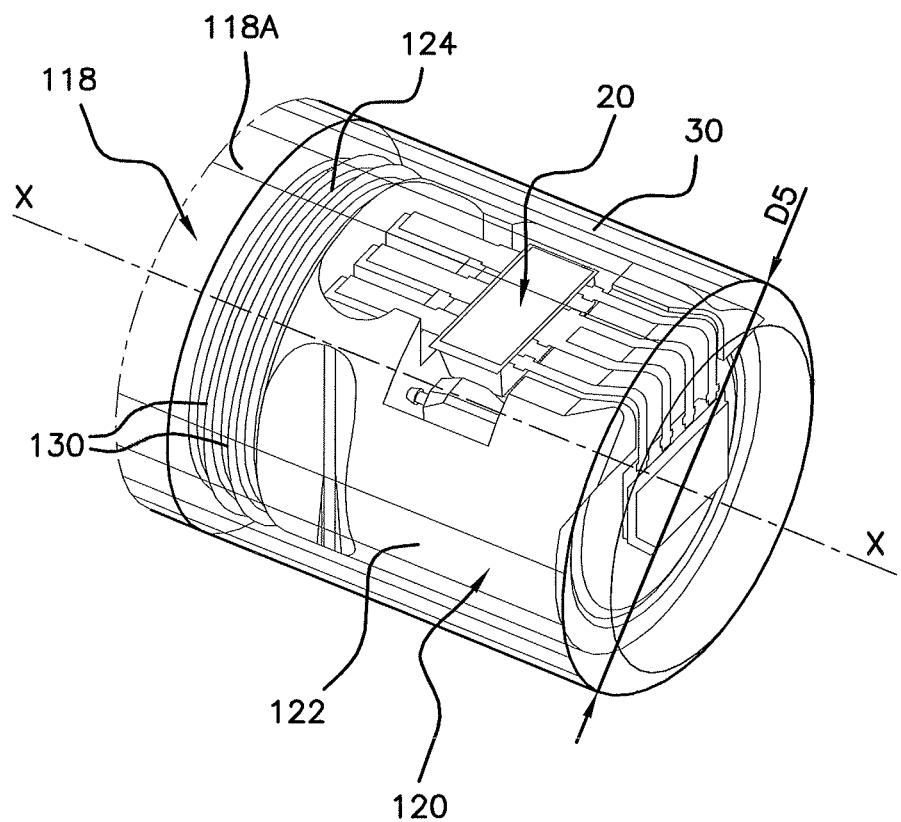
FIG. 5 illustrates the reception element of the sensor of FIG. 1 after overmolding.

With reference to FIGS. 1 and 5, in which it appears transparently, the protective overmolding 30 has a cylindrical shape with a circular cross section with an external diameter D5 (with reference to FIG. 5) of longitudinal axis XX, completely surrounding the element 120 for receiving the electronic measurement module 20 in such a way as to protect it, for example from the projections or from gases generated by the motor vehicle.

In this example, the diameter D3 of the linking wall 118B and the diameter D5 of the protective overmolding 30 are equal, the mold used to form the protective overmolding 30 having an internal diameter equal to the diameter D3 of the linking wall 118B so as advantageously to be able to easily hold the body 10 of the sensor 1 in the mold while injecting the overmolding material, thereby making it easy to manufacture the sensor 1. It will be noted that the first cylindrical portion, the second cylindrical portion, the linking portion 118A, the fins 130 and the protective overmolding 30 all extend in one and the same longitudinal axis XX.

The manufacturing of the sensor will now be described with reference to FIGS. 1 to 5.

In a step E1, the body 10 of the sensor 1 is first of all molded (FIG. 2). This molding makes it possible to create a single part, i.e. in one piece, comprising the connecting portion 112, the plate 114 and the part 118 for linking the base 110 and the first cylindrical portion 122, the second cylindrical portion 124 and the fins 130 of the reception element 120.

The body 10 may, in a known manner, be molded around a connector 12 (with reference to FIG. 4) linking the connecting portion 112 to the reception space 123 of the first cylindrical portion 122 and making it possible to electrically connect the electronic measurement module 20 to the electrical communication network of the vehicle.

In this single-piece body 10, the difference between the diameter D4 of the circular fins 130 and the diameter D3 of the linking portion 118A is advantageously small, in this preferred example of the order of 2 mm, the difference between the diameter D2 of the second cylindrical portion 124 and the diameter D4 of the circular fins 130 is also advantageously small, preferably less than 2 mm, and the difference between the diameter D2 of the second cylindrical portion 124 and the diameter D1 of the first cylindrical portion 122 is also advantageously small, preferably less than 1 mm.

Once the body 10 has been produced, the electronic measurement module 20 is then mounted in the reception space 123 of the first cylindrical portion 122 of the reception element 120 of the body 10 in a step E2 (FIG. 4).

Such mounting may involve electrically connecting, for example soldering, the electronic measurement module 20 to the electrical connector 12 if necessary.

Lastly, in a step E3, the reception element 120 is overmolded with a thermoplastic material such that the external diameter D5 of the protective overmolding 30 thus obtained, which is cylindrical in shape with a circular cross section, is substantially equal to the third diameter D3, as illustrated in FIG. 5.

It is noted that the linking wall 118B linking the linking portion 118 and the base 110 then forms a surface for stopping the thermoplastic overmolding material.

The small difference between the diameter D4 of the circular fins 130 and the diameter D3 of the linking portion 118A, on the one hand, and the small difference between the diameter D2 of the second cylindrical portion 124 and the diameter D4 of the circular fins 130, on the other hand, make it possible to ensure that the deviation between the volume of thermoplastic material injected around the first cylindrical portion 122 and the volume of thermoplastic material injected around the second cylindrical portion 124 is small, for example less than 30%. This, in combination with the difference in diameter between D1 and D2 and the presence of the wall 124B, makes it possible to greatly limit or even to prevent the shrinkage, that is to say the movement, of the thermoplastic material at the circular fins when said material cools after overmolding, thus avoiding the formation of cracks on said fins 130 that could reduce the sealtightness of the sensor 1, in particular with respect to liquids.

It should be noted, lastly, that the present invention is not limited to the examples described above, and is open to many variants that are accessible to those skilled in the art. In particular, the shapes and dimensions of the elements of the sensor 1, as shown in the figures so as to illustrate an exemplary embodiment of the invention, should not be interpreted as being limiting.

The invention claimed is:

1. A method for manufacturing a measurement sensor for a motor vehicle, said sensor comprising a body and an electronic measurement module mounted in said body, said method comprising:
   a step of molding the body of the sensor so as to define, in one and the same material:
      a base for fastening the sensor in the motor vehicle,
      an element for receiving the electronic measurement module, delineating a space for receiving the electronic measurement module and comprising a first cylindrical portion with a first circular cross section and a second cylindrical portion with a second circular cross section, a diameter of the second cylindrical portion being smaller than a diameter of the first cylindrical portion, and
      a seal made from material of said second cylindrical portion,
   after the step of molding, a step of mounting the electronic measurement module in the reception space, and
   after the step of mounting, a step of overmolding the element for receiving the electronic measurement module.

2. The method as claimed in claim 1, wherein the molding step defines the seal with at least one circular fin made from material of the second cylindrical portion.

3. The method as claimed in claim 1, wherein the molding step defines the reception element such that it is linked to the base at a linking wall with a circular cross section a diameter of which is greater than the diameter of the first cylindrical portion, and such that the difference between the diameter of the linking wall and the diameter of the first cylindrical portion is less than 2 mm.

4. The method as claimed in claim 3, wherein the molding step defines the reception element such that the difference between the diameter of the second cylindrical portion and the diameter of the first cylindrical portion is less than 1 mm.

5. A measurement sensor for a motor vehicle, said sensor comprising a body, an electronic measurement module and a protective overmolding, said body comprising, in one and the same material:
   a base for fastening the sensor in the motor vehicle,
   an element for receiving the electronic measurement module, made from a material of the base, comprising a first cylindrical portion with a first circular cross section delineating a space in which the electronic measurement module is mounted and a second cylindrical portion, the diameter of the second cylindrical portion being smaller than the diameter of the first cylindrical portion, the protective overmolding enveloping the element for receiving the electronic measurement module, and
   a seal made from a material of said second cylindrical portion.

6. The sensor as claimed in claim 5, wherein the seal comprises at least one circular fin made from the material of the second cylindrical portion.

7. The sensor as claimed in claim 6, wherein the seal comprises two circular fins with an identical diameter and that are arranged in parallel.

8. The sensor as claimed in claim 5, wherein a difference between the diameter of the second cylindrical portion and the diameter of the first cylindrical portion is less than 1 mm.

9. The sensor as claimed in claim 5, wherein the reception element is linked to the base at a linking wall with a circular cross section the diameter of which is greater than the diameter of the first cylindrical portion, the difference between the diameter of the linking wall and the diameter of the first cylindrical portion being less than 2 mm.

10. A vehicle comprising a measurement sensor as claimed in claim 5.

11. The method as claimed in claim 2, wherein the molding step defines the reception element such that it is linked to the base at a linking wall with a circular cross section a diameter of which is greater that the diameter of the first cylindrical portion, and such that the difference between the diameter of the linking wall and the diameter of the first cylindrical portion is less than 2 mm.

* * * * *